May 29, 1951  W. L. STAFFORD  2,554,963
HEAT INSULATING BLANKET AND METHOD OF MANUFACTURE
Filed July 3, 1948
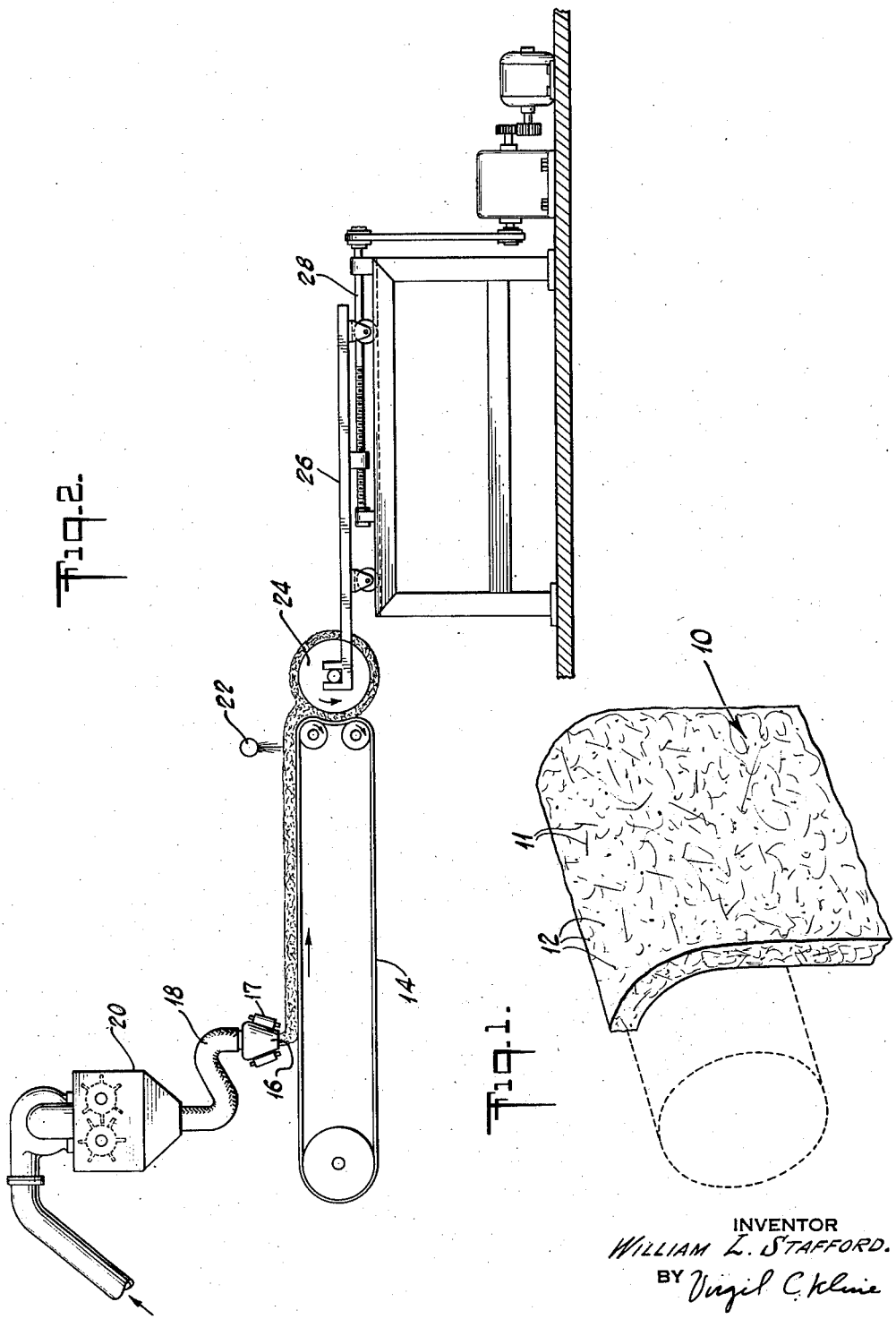
INVENTOR
WILLIAM L. STAFFORD.
BY
ATTORNEY Patented May 29, 1951

2,554,963

UNITED STATES PATENT OFFICE 2,554,963

HEAT INSULATING BLANKET AND METHOD OF MANUFACTURE

William L. Stafford, Somerville, N. J., assignor to Johns-Manville Corporation, New York, N. Y., a corporation of New York Application July 3, 1948, Serial No. 37,016

6 Claims. (Cl. 154—28)

The present invention relates to light weight thermal insulation, and is particularly directed to improved felted mineral fiber blankets which are flexible and handleable and provide efficient thermal insulation at high temperatures, and to a method of manufacturing such blankets.

A particular purpose is to provide efficient handleable flexible heat insulation blankets suitable for high temperature service such as for covering curved wall surfaces of jet engines. Insulation elements suitable for such service should have a low thermal conductivity factor and should be easily removable and replaceable and retain adequate heat insulating properties at temperatures at least as high as 2000° F. Available heat insulating elements of suitable light weight and thermal insulating properties tend to develop brittleness or friability, structural weakness, and loss of handleability and heat insulating efficiency, when applied to such service.

An object of the present invention is therefore to provide a heat insulating blanket in the form of a mineral fiber felt which has good heat insulating and shape retaining properties together with flexibility and handleability in service at temperatures up to 2000° F.

Another object of the invention is to provide a method of manufacturing light weight flexible thermal insulating blankets adapted for service at temperatures up to 2000° F.

The present insulation blankets are light in weight and flexible and exhibit structural stability and ease of handling even after long service at high temperatures and after frequent removal and reinstallation. The blankets are produced by an air suspension dry felting and low pressure consolidation procedure which develops thorough interfelting of fibers, supplemented by uniform spray dispersal of a dilute aqueous suspension of bentonite clay binder within the felted fiber blanket in amount usually approximating 1% to 3% of the total dry weight of the blanket.

With the above objects and features in view the invention consists in the improved thermal insulation blanket and method of manufacture which are hereinafter described and more particularly defined by the accompanying claims.

In the following description reference will be made to the attached drawing, in which:

Fig. 1 is a perspective view of a portion of a light weight flexible thermal insulation blanket adapted for high temperature service in accordance with the present invention; and Fig. 2 is a diagrammatic side elevation view of one form of apparatus suitable for producing the blankets of the present invention.

Referring to Fig. 1 of the drawing, the present heat insulating blanket 10 comprises a light weight felt of well opened, finely divided and fluffed mineral fibers 11 such as amphibole group asbestos fibers, such fibers being interfelted and lightly bonded with 0.6%–3% by weight of bentonite clay particles 12 uniformly dispersed throughout the blanket. This small amount of bentonite binder is sufficient to impart structural stability together with flexibility for service at temperatures up to 2000° F. in blankets having densities in the range 2–10 lbs./cu. ft.

A suitable method of manufacture includes the steps of forming a thin layer of fluffed interfelted long amosite asbestos fibers by a dry felting procedure, spray distributing a dilute suspension of bentonite binder substantially uniformly throughout the interfelted fibers, building up a multi-layer body of thus formed and bentonite treated fibrous layers, and shaping and lightly consolidating the laminate to a blanket of suitable thickness and low density, followed by a drying operation to remove moisture. The final blanket may retain substantially the structural characteristics and fiber lay originally developed by the dry felting procedure.

One suitable form of apparatus and method for producing the present insulation blankets is described in copending U. S. Patent application Serial No. 779,048, filed October 10, 1947, Kenneth F. Greene, for Method and Apparatus for Manufacture of Insulating Bodies, now Patent No. 2,503,041. As shown in Fig. 2, the upper reach of an endless belt or conveyor 14 is actuated to continuously travel in one direction by operating one of its supporting drums as a driving pulley. The conveyor is made of relatively flexible sheet material such as canvas and is either supported in relatively taut relation, or its length may be somewhat greater than the length of the normal path around its supporting drums, providing sufficient slack to permit the belt to be deformed or indented by contact with a rotating mandrel. A fiber feed spout 16 may be movably supported above the conveyor on a carriage 17 for reciprocating travel back and forth in a path which overlies the upper reach of the conveyor. The carriage and feed spout may reciprocate either transversely to the direction of movement of the conveyor, or parallel thereto. The feed spout is preferably connected by a flexible pipe 18 with a fiber fluff box 20. Mounted within the fluff box are oppositely paired spike rolls which are employed to develop a thoroughly dispersed and fluffed air suspension of well opened mineral fibers, preferably amosite asbestos fibers, and to project such fiber suspension downwardly through the feed spout onto the upper reach of the conveyor. The upper end of the fluff box is connected with a fan which is positioned to receive and deliver an air suspension stream of suitably opened fibers from a fiber fiberizing unit.

Binder applicators 22 may be mounted for reciprocation with the carriage and feed spout, or said binder applicators may be mounted in stationary position as shown. The binder applicators may comprise lengths of perforated pipe coupled to flexible supply tubes and having wall perforations directed and spaced for fine spray distribution of a dilute water suspension of bentonite clay binder over the full width of the top surface of the conveyor and the layer of dry felted fibers thereon. One or more charge smoothing or consolidating rolls (not shown) may be mounted in pressure contact with the top surface of a multi-layer charge previously laid down on the conveyor. After suitable moistening and consolidation of the charge it may be transversely cut into sections or blankets which are transferred off the end of the conveyor onto metal platens.

In the illustrated form of the apparatus a mandrel 24 is mounted for reciprocation on a supporting carriage 26 controlled by a positive feed screw 28. The mandrel is removably mounted on the carriage, and the feed screw serves to control the rate at which the mandrel can be withdrawn from contact with the surface of the conveyor 14, thereby controlling the ultimate pressure to which a fiber laminate is subjected as it is built up on the mandrel, by controlling the relative speed at which the mandrel is retracted away from the conveyor in relation to the speed of travel of the conveyor. The carriage serves to normally urge the mandrel into close contact with the conveyor up to the time that the feed screw goes into operation to effect gradual withdrawal of the mandrel from its forward position.

According to that method of producing blankets which is shown in Fig. 2 the feed spout 16 is mounted in transversely reciprocating position over the conveyor, and the conveyor is operated at such speed relative to the rate of fiber feed through the feed spout as to build up on the conveyor a layer of suitably open and fluffed dry fibers which may have a thickness of from say ½ inch to 2 inches. The thus deposited dry fibers are then wetted by a water suspension of bentonite clay applied under pressure through spray heads 22 so as to uniformly disperse the clay over the fiber surfaces throughout the full thickness of the fiber layer. A mandrel 24 of the required size to produce a tubular laminate is mounted on the mandrel carriage, and the carriage is moved forwardly under the influence of the feed screw until the mandrel contacts the surface of the conveyor 14 and distorts or forces the conveyor inwardly to the extent permitted by the length and stretch characteristics of the conveyor. The conveyor in this case is made sufficiently long and with sufficient stretch so that the degree of distortion which it undergoes under the pressure of the mandrel, develops an arc of contact between the mandrel surface and conveyor representing at least about ¼–⅓ arc segment of the circumferential area of the mandrel. As the mandrel is held in this position, it is caused to rotate by its friction contact with the layer of fibers on the conveyor.

Forward movement of the conveyor brings the relatively thick layer of unconsolidated charge material into contact with the mandrel surface. Owing to the pressure of the mandrel against the layer material the charge is picked up from the conveyor and wrapped about the mandrel. The control screw mounting of the mandrel carriage permits gradual backward movement of the mandrel away from the conveyor at a controlled rate that is proportioned to the thickness of the material building up on the mandrel surface. The force resisting this movement remains constant, thereby maintaining a substantially uniform low pressure over the mandrel surface against the fibrous multi-laminar tube building up on the mandrel surface. As many layers of charge material are built up on the mandrel as are required to form a blanket of predetermined thickness. Operation of the equipment is then halted, the mandrel is removed from the bearings, and the shaped tubular laminate on the mandrel is split longitudinally and flattened out to blanket form. The blanket 10 thus formed is then subjected to air drying to eliminate moisture.

According to a modified method for producing blankets of between say ¾ inch and 2 inches final thickness, a carriage mounted fiber feed spout and bentonite sprays may be reciprocated back and forth in a direction parallel with the top surface of the conveyor through a path of travel of about 6 to 8 feet in length at an average speed of at least about 30 feet per minute. With the carriage operating at this speed and with the mouth of the feed spout and the bentonite slurry sprays extending over substantially the full width of the conveyor, the conveyor may be moved continuously at a speed of say 1–3 feet per minute. Prior to consolidation the superposed layers of fibers may be built up on the conveyor to a depth of as much as 10 inches. It is desirable to operate the carriage and conveyor at such relative speeds as to build up a laminate having about 60–75 plies per inch of finished thickness. In this manner very thin layers or plies of dry fluffed fiber composition are laid down continuously in superposed layers on the conveyor surface and are moistened with bentonite slurry and built up to substantial thickness, with a considerable degree of intra-laminar felting of fibers and with long overlaps. The thus wetted multi-layer blanket of fibers and dispersed plasticized clay is smoothed and lightly compressed by passing it beneath one or more pressure rolls which may reciprocate with the carriage, but preferably operate independently thereof. These rolls are adjustable with respect to their spacing above the conveyor so as to effect consolidation and shaping of the charge material on the conveyor to approximately final thickness dimensions. After passing these pressure rolls the sheets of wet fibrous material may be cut into blankets of suitable dimensions which are transferred to pallets. The pallets are then introduced to a closed autoclave or drier wherein the wet blankets are subjected to several hours' drying treatment in an atmosphere of circulating hot air at suitable drying temperatures.

Insulation blankets have been produced which are usually 3/4 inch to 2 inches thick and having densities in the range 2–10 lbs./cu. ft., with adequate structural strength for normal handling during installation and removal, and which resist deformation and retain flexibility and handleability after many hours exposure of one face thereof to temperatures of the order of 2000° F. The preferred insulating blankets comprise 97–99% by weight of amosite asbestos fibers, and 1%–3% of finely divided bentonite clay uniformly dispersed over the fiber surfaces as the sole binder. Suitable mineral fibers other than amosite asbestos are those which are not seriously affected by long exposure to temperatures up to 2000° F., such as refractory mineral wool and heat resistant amphibole asbestos fibers. The preferred fiber comprises long amosite asbestos fibers of standard M-1 grade. The blanket may incorporate 10–25% of non-fibrous, highly refractory, light weight filler material such as microporous heat expanded cellular perlite having a bulk or loose density within the range 3 to 6 lbs./cu. ft. The only suitable binder ingredient known is a water plasticizable clay of the type of bentonite in a particle size preferably classifying finer than 150 mesh.

A very satisfactory insulation blanket comprises felted amosite asbestos fibers, lightly bonded with approximately 0.6% to 1% by weight of bentonite clay uniformly dispersed throughout the blanket. An amosite asbestos blanket containing about 1% bentonite clay as its sole binder, when made in accordance with the method herein described, may have a density of approximately 6 lbs./cu. ft. and sufficient structural stability to withstand long service at temperatures in the range 1000–2000° F. without substantial reduction of its insulating properties. In this blanket the volume of bentonite binder represents not to exceed 0.2% of the total blanket volume. An amosite blanket of 6 lbs./cu. ft. density has a thermal conductivity of 0.26 B. t. u. per hour per square foot per degree F. per inch thick at a temperature of 50° F., and a thermal conductivity well below 1.0 at a temperature of 1000° F. Such blanket is sufficiently flexible in thicknesses of 1/2 to 2 inches for application to the curved walls of jet engines, and the blanket has sufficient structural stability and handleability to permit of its being removed from insulating position and reinstalled many times as insulation on the curved walls of a jet engine operating at high temperatures. Amosite asbestos blankets have been produced by the present method with densities of from 2–10 lbs./cu. ft. The blankets incorporating as much as 3% bentonite binder do not have as great flexibility as do those containing only about 1% of bentonite binder.

The invention which has been thus described by detailed example is not limited as to such details and it is to be understood that variations, changes and modifications are contemplated within the scope of the invention as defined by the following claims.

What I claim is:

1. A heat insulating blanket which retains structural strength, handleability and flexibility at temperatures as high as 2000° F., said blanket comprising a thick dry felted fiber bed consisting essentially of comparatively long finely divided high temperature resistant mineral fibers, and approximately 1%–3% dry weight of finely divided bentonite clay uniformly dispersed throughout the blanket as a binder.

2. A heat insulating blanket which retains dimensional stability, flexibility and handleability at temperatures up to 2000° F. comprising, a thick dry felted fiber bed consisting essentially of interfelted long finely divided high temperature resistant mineral fibers and approximately 0.6–3% dry weight of finely divided bentonite clay distributed uniformly throughout the blanket on the fiber surfaces, said blanket having a density in the range 2–10 lbs./cu. ft. and having substantial structural strength and flexibility.

3. A heat insulating blanket of approximately 6 lbs./cu. ft. density which exhibits structural stability, handleability and flexibility after prolonged exposure to temperatures as high as 2000° F. at one face thereof, said blanket comprising a dry felted bed consisting of long finely divided amosite asbestos fibers, and approximately 1% dry weight of finely divided bentonite clay uniformly dispersed throughout the blanket as a binder.

4. The method of manufacturing high temperature resistant insulating blankets which comprises, forming by precipitation from air suspension a dry felt layer of finely divided high temperature resistant mineral fibers, dispersing throughout said layer of dry felted fibers an aqueous suspension of bentonite clay in amount approximating 0.6–3% dry weight of bentonite, building up a thick blanket of said bentonite treated layers of felted fibers, lightly consolidating the blanket under uniformly applied pressure controlled to produce a product of predetermined low density, and drying the product to remove moisture.

5. In manufacturing low density insulation blankets the steps comprising, forming an air dispersed suspension of well opened and fluffed finely divided high temperature resistant mineral fibers, projecting a stream of said air suspended fibers downwardly onto the top surface of a traveling conveyor to form a layer of dry felted fibers, continuously shifting the path of said stream backwardly and forwardly over the conveyor surface to form a deep bed of lapped, thin layers with intra-laminar felting of fibers, wetting the deposited fibers with a pressure spray of water dispersed bentonite clay in amount representing 1–3% dry weight of bentonite whereby to distribute finely divided clay particles substantially uniformly over the fiber surfaces, and consolidating the layers of deposited and wetted fibers under substantial uniform pressure to build up an intra-laminar felt blanket of suitable thickness.

6. The method of manufacturing high temperature resistant insulating blankets which comprises, laying down a layer of dry felted amosite asbestos fibers, spraying said layer of dry felted fibers with a dilute aqueous suspension of bentonite clay, building up a thick multi-layer blanket of said bentonite treated layers of felted fibers, and lightly consolidating the blanket under uniformly applied pressure to produce a product having an approximate final density of about 6 lbs./cu. ft. containing approximately 1% bentonite clay, and drying the product to remove moisture.

WILLIAM L. STAFFORD.

REFERENCES CITED

The following references are of record in the file of this patent:

UNITED STATES PATENTS

| Number | Name | Date |
|---|---|---|
| 1,613,137 | Seigle | Jan. 4, 1927 |
| 1,887,726 | Weber | Nov. 15, 1932 |
| 2,448,186 | Miller et al. | Aug. 31, 1948 |
| 2,450,915 | Powell | Oct. 12, 1948 |